Feb. 17. 1925.

G. W. DIEMER

LOCK NUT

Filed May 22, 1924

1,527,031

INVENTOR.
George W. Diemer
by Parker, Prochnow & Beau.
ATTORNEYS.

Patented Feb. 17, 1925.

1,527,031

UNITED STATES PATENT OFFICE.

GEORGE W. DIEMER, OF EAST AURORA, NEW YORK.

LOCK NUT.

Application filed May 22, 1924. Serial No. 715,097.

*To all whom it may concern:*

Be it known that I, GEORGE W. DIEMER, a citizen of the United States, residing at East Aurora, in the county of Erie and State of New York, have invented a new and useful Improvement in Lock Nuts, of which the following is a specification.

This invention relates to improvements in lock nuts, and particularly to that kind which consists of two nuts or members having cooperating eccentric portions, one of which is adapted to be turned relatively to the other for locking the nut on a bolt.

The objects of this invention are to provide a lock nut of the kind stated, in which one of the members is provided with a split wall or part adapting this part, when the members are in locked relation, to be deformed and to engage the other member to prevent the unintentional disengagement of the members; also to provide a lock nut of this sort that may be firmly locked in the manner stated, without marring or injuring the threads of the bolt or object to which it is attached; also to provide a lock nut which, after being secured in locked position by deforming a portion of one of the members, may be released by turning one member with reference to the other, and in which said turning movement will restore the deformed member to its original form so that the lock nut may be used repeatedly.

Other objects of the invention are to improve lock nuts in the respects hereinafter specified and claimed.

Figure 1:
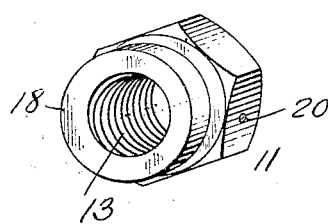
Figs. 1 and 2 are perspective views of the two members of a lock nut constructed in accordance with the preferred embodiment of this invention.
Figure 2:
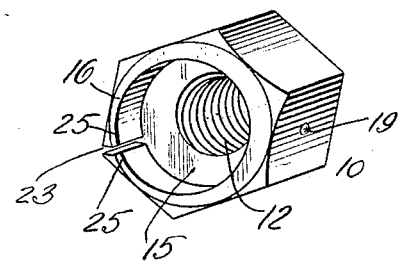
Figure 3:
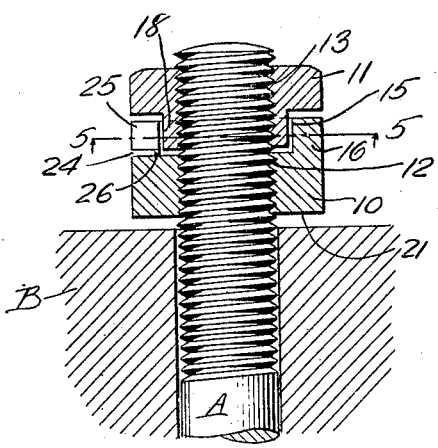
Fig. 3 is a longitudinal sectional elevation showing the lock nut being applied to a bolt.
Figure 4:
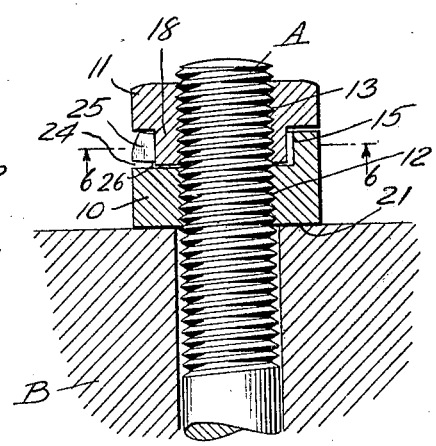
Fig. 4 is a similar view of the lock nut in locking position on the bolt.
Figure 5:
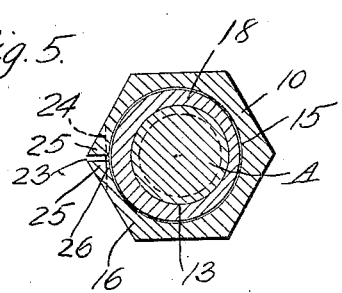
Figure 6:
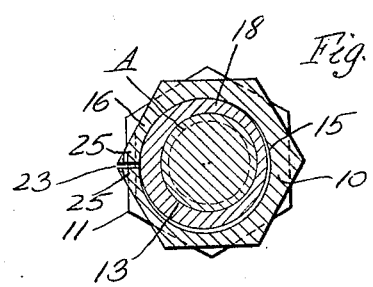

Figs. 5 and 6 are transverse sections on lines 5—5 and 6—6 respectively, Figs. 3 and 4.

The lock nut of the present invention, as shown in the drawings, comprises two nuts or members, one of which is the nut proper 10 and the other is the locking member 11. These members are preferably of the usual hexagonal or polygonal form adapting them to be turned with a wrench, and they are provided with central threaded holes or apertures 12, 13, respectively, adapting them to be secured on a bolt A or other threaded object. The members 10 and 11 are further provided with interfitting, eccentric parts, adapted to be engaged to secure them against rotation on the threaded bolt or object A when in operative position, by turning one of the members relatively to the other. As shown, the nut 10 is formed with an aperture 15 the axis of which is eccentrically disposed with reference to the axis of the hole 12. The aperture 15 is preferably cylindrical and by its eccentricity produces a relatively thin portion in the wall 16 of the nut. The locking member 11 is provided with a cylindrical boss 18, the axis of which is eccentrically disposed with reference to the axis of the hole 13. The boss 18 is of slightly less diameter than the aperture 15 of the nut. It will be understood, of course, that the nut 10 and the locking member may be reversed, if desired, so that the locking member 11 will engage the plate or object B.

When the lock nut is to be used, the locking member is arranged with the boss 18 extending into the aperture 15 and concentric therewith, this position being preferably assured by providing suitable indicating means, such as the indentations 19, 20 on the nut 10 and locking member 11, which when alined, indicate that the eccentric portions of the two members are substantially concentric see Figs. 3 and 5. When the nut lock has been thus assembled, it is screwed upon the bolt or externally threaded object A, keeping the members in the same relation, until the flat face 21 of the nut engages the plate or object B which is being bolted or secured, and then by rotating the locking member 11 relatively to the nut 10 its eccentric boss 18 will be turned into engagement with the wall 16 of the eccentric aperture 15 and thereby exert opposing pressures on the two members of the lock nut to cause them to bind on the threads of the object A at opposite sides so that the lock nut will be held against rotation thereon.

If desired the eccentric boss 18 could be formed on the nut 10, and the recess 15 in the member 11 without departing from the scope of this invention.

Lock nuts secured together in a substantially similar manner have heretofore been provided, but such structures are either so formed that they mutilate the threads of the bolt to which they are applied or else do not have means for preventing the parts of the lock nut from loosening.

Means are provided in the present invention whereby the two members of the lock nut may be held in locked relation indefinitely, and which nevertheless permits the members to be separated and removed, and used again repeatedly. This result is accomplished by forming a longitudinal narrow notch or slit 23 extending through the wall 16 of the nut from top to bottom, preferably in that portion which is farthest removed from the center of the hole 12, and forming a second slit 24 extending transversely through the bottom of the wall into or adjacent the aperture 15, and so disposed that the slit 23 opens into said slit 24 substantially midway between its ends. This construction weakens the metal of the wall 16 and provides a pair of opposed sections 25 of metal, attached to the nut by relatively thin connecting portions 26, such that, after the eccentric boss 18 has been turned to the locking position indicated in Fig. 6, the sections 25 may be upset or deformed by hammering or otherwise and forced inwardly tightly against the boss 18. This operation positively prevents the locking member 11 from being unintentionally turned back to a position in which it is concentric with the aperture to cause the lock nut to be loosened, for the reason that the sections 25 extend into the path of that portion of the eccentric which is in engagement with the wall 16 of the nut. Nevertheless the locking member 11 may be turned back to loosen it from the nut 10, when desired, by using a separate wrench or tool to hold each of the parts 10 and 11 of the lock nut, and by exerting sufficient force the eccentric boss 18 may then be turned back and will force the weakened sections 25 apart to substantially their original form and position. The lock nut may then be removed from the threaded object A and can be used repeatedly as long as the sections 25 remain attached to the nut 10.

The described construction of the lock nut is such that a positive and effective locking action is assured, and the members are adapted to be locked on the bolt so that the two members will bind securely thereon, but nevertheless, as there are no parts other than the threads of the lock nut to engage the bolt, the bolt threads will not be injured by the use of the lock nut. The lock nut is inexpensive to manufacture and its construction is such that it can be used repeatedly without reducing its securing qualities.

I claim as my invention:

A lock nut comprising two members, each having a central threaded hole adapting said members to be screwed on an externally threaded bolt or object, an eccentrically disposed, longitudinally extending part on one of said members through which the threaded hole in said member extends, an eccentric recess forming a wall surrounding the threaded hole in the other member and adapted to receive said eccentric extending part of said first member and in which said part is adapted to fit concentrically to permit said lock nut to be screwed on said object, one of said members being adapted to be turned relatively to the other member so that its portion of greatest eccentricity will be misalined with reference to the major transverse axis of said recess and to engage the wall of said recess to lock said lock nut on said bolt, and said wall being slit at a point other than the point of contact therewith of said eccentric part so as to provide sections connected to said second member by weakened portions adapting said sections to be bent against said eccentric part to hold the same in locking position, and said sections being adapted to be restored to their original form when force is applied to turn said eccentric part and said sections relatively to each other.

GEORGE W. DIEMER.